Patented Oct. 30, 1934

1,978,889

UNITED STATES PATENT OFFICE 1,978,889

PROCESS OF PREPARING BASE EXCHANGE MATERIALS

Abraham S. Behrman, Chicago, Ill., assignor to General Zeolite Co., Chicago, Ill., a corporation of Illinois No Drawing. Application September 23, 1931, Serial No. 564,721

8 Claims. (Cl. 23—113)

This invention relates to a process of preparing base exchange materials suitable for water softening and other purposes.

The art of water softening by the base exchange or "zeolite" process is now so well known that no detailed description of it is required. Suffice it to say that, in general, according to this method, hard water is passed through a bed of base exchange materials whereupon the calcium and magnesium in the hard water are replaced by sodium from the zeolite. When the zeolite has given up all of its readily replaceable sodium in exchange for calcium and magnesium from the hard water, the zeolite is "regenerated" by treating it with a solution of sodium chloride, which drives out the calcium and magnesium from the zeolite and renews its supply of sodium.

One of the earliest—and still widely used—processes of preparing by wet methods base exchange silicates suitable for water softening purposes employs as the principal reagents a solution of sodium aluminate and a solution of sodium silicate. The base exchange materials so prepared have frequently possessed quite high base exchange capacities. In general, however, such products are relatively soft, soluble and short-lived. These defects may be due in part to the inherent nature of products made from these raw materials, but they are also undoubtedly due to the highly alkaline nature of both of the reacting solutions and to the additional amount of free alkali liberated in the reaction mixture.

It has heretofore been proposed to wash with water the gelatinous reaction products obtained in the employment of these and other wet method reactions in order to remove the free alkali partially or completely. Such procedure is made difficult and expensive, however, due to the fact that the base exchanging gelatinous reaction products possess a remarkably strong adsorptive capacity for free alkali, which they retain with great tenacity. To remove substantially all of the free alkali by means of washing with water is a long and tedious process, in some cases requiring many days of continuous washing. Furthermore, the tendency of this long water wash is to peptize the gelatinous reaction product, possibly because of the exceedingly low concentration of electrolyte in the wash water.

It is not practical to attempt a rapid removal of free alkali from the reaction products by washing with a dilute solution of one of the common acids such as sulfuric or hydrochloric; for in such case the acid would neutralize not only the free alkali which it is desired to remove, but also react with the alkali metal oxide which is combined with alumina and silica to form the base exchanging compound. Since this combined alkali metal oxide functions as the replaceable base in the base exchange compound, its removal would obviously result in a destruction of the base exchange characteristics of the material. It has not been found possible, when using a solution of a highly disassociated acid such as sulfuric or hydrochloric or a solution of an equivalent acidic substance, to separate neutralization of the free alkali from removal of the combined alkali metal oxide necesssary for the base exchange properties of the product. Neutralization of the free alkali in the interior portion of a gelatinous particle requires penetration of the acid solution from the exterior of the particle with progressive neutralization of alkali as it proceeds inward. When such a solution finally penetrates to the center of the gelatinous particle with sufficient acidity to neutralize the free alkali there, it follows that there must be a progressively increasing degree of acidity from the center to the outside of the particle, so that in the outer portions of the particle there is ample opportunity not only for neutralization and removal of the combined alkali metal oxide, but even for the solution of aluminum oxide or other corresponding metallic oxide.

The present invention has for its principal object the improvement of the products obtained from reaction mixtures of the character described by employing a novel method of removing the free alkali from such reaction products, preferably at some time prior to final drying. The improvement resides chiefly in greater hardness, durability, and insolubility of the final product, and, in many cases, in a greatly increased base exchange capacity. In addition to the improvement in the product itself, the manufacturing process is considerably simplified, in that after the removal of the free alkali the reaction mixture may be dried down directly to the point of complete removal of moisture without fear of obtaining the chalky or pulverulent material that would frequently be formed if such treatment for the removal of free alkali were not practiced.

Other objects of the invention will become apparent from the specification and the appended claims.

Briefly stated, the invention consists in washing base exchange reaction products, containing free alkali, with a buffer solution capable of neutralizing the free alkali without danger of establishing injurious acid conditions and thereby injuring or destroying the base exchange property of the material.

By a "buffer solution" is meant in general a solution of one or more substances to which may be added relatively large amounts of free alkali or free acid but with comparatively little change in the pH value of the solution itself. For the purposes of this specification and the appended claims a buffer wash solution is defined as a solution of relatively high pH, that is, neutral or alkaline to the methyl-orange class of indicators, which will neutralize relatively large amounts of free alkali with but comparatively little change in the hydrogen ion concentration of the solution itself. By the term "free alkali" as used in this specification and in the claims is meant any type of alkalinity which will give the typical color reaction with phenolphthalein indicator, and it therefore denotes chiefly the hydroxides and carbonates of the alkali metals, but not the bicarbonates. It has been shown that some bicarbonate alkalinity in the zeolite reaction mixture does not deleteriously affect the final product.

Since a solution containing free alkali reacts alkaline to phenolphthalein, it follows that the pH of such a solution must be about 8.3 or above. It follows also that the pH of the buffer wash solution employed in accordance with my invention must necessarily be under 8.3, and it will usually be found preferable to employ a buffer wash solution with an initial pH as low as the nature of the buffer and the strength of the solution permits. It is therefore obvious that the buffer wash solution need not be acidic in the usual sense, since such solutions may have a pH of 7.0 or over.

While it is evident that a wide variety of buffer wash solutions may be successfully employed, I have used to special advantage phosphate buffer solutions and borate buffer solutions. A phosphate solution that I have employed satisfactorily, for example, contains 29.5 grams disodium phosphate ($Na_2HPO_4$) and 17.5 grams mono sodium phosphate ($NaH_2PO_4.H_2O$) per liter. The pH of this solution is 7.0. A borate solution giving excellent results contains per liter 8.61 grams borax, 29.4 grams boric acid, and 6.94 grams sodium chloride. The pH of this solution is 7.0 to 7.1. I have also used buffer wash solutions of boric acid alone; these are quite well suited for the purpose, due to the extremely low dissociation constant of boric acid. One solution, containing about 8.82 grams boric acid per liter, has a pH of about 6.6.

One type of reaction product which I may treat with my buffer wash solution is that prepared from solutions of sodium aluminate and sodium silicate, employed preferably, but not necessarily, in such concentrations and proportions and under such conditions that a stiff homogeneous gel forms when the reacting solutions are mixed together. For example, I may mix 1000 volumes of a solution of sodium silicate containing 70.8 grams $SiO_2$ and 22.8 grams $Na_2O$ per liter with 240 volumes of a solution of sodium aluminate containing about 70.1 grams $Na_2O$ and 71.8 grams $Al_2O_3$ per liter. Such a reaction mixture quickly sets to a stiff homogeneous gel.

Another broad class of alkaline base exchange reaction products which may be treated with my buffer wash solution is that formed from a solution of sodium silicate and a solution of an acid-reacting amphoteric metal salt such as aluminum sulphate, iron chloride, vanadium sulphate or equivalent compound. Typical examples of this type of reaction mixture are disclosed in my Patents 1,515,007 and 1,806,663, as well as in my copending application Serial No. 341,845, filed February 21, 1929 now Patent 1,930,503. In all of these cases the reaction mixture is preferably such as to form a homogeneous gel of the type previously referred to.

There are several methods which I have successfully used in washing these precipitates or gels with buffer solutions. On account of the nature of the action of the buffer solution a long period of contact is permissible so that immersion and decantation or slow percolation may be employed. Another method is to wash in thin layers as in a filter press or by a vacuum process as thereby the time required is much less.

The precipitate or gel may be washed directly with the buffer solution until the gel no longer gives a pink color with phenolphthalein indicator, at which time the wash solution is removed and the gel dried in the usual way, preferably at temperatures below 100 degrees C. Or, in order to avoid unnecessary waste of buffer solution, the gel may be washed first with water to remove that portion of the free alkali which is readily washed out. This preliminary water wash is particularly advantageous in the case of the highly alkaline reaction mixtures resulting from the employment of sodium silicate and sodium aluminate. In some cases it has also been found desirable to follow the buffer wash solution with a final water wash for the purpose of reducing the amount of dissolved solids in the reaction mixture before drying.

Before or after washing the gelatinous reaction product, I have found it in many cases to be both desirable and economical to subject the gelatinous material to pressure—as for example in a hydraulic press. When this pressing operation is carried out before the washing, it serves both to reduce greatly the amount of free alkali in the reaction mixture and also to strengthen the gel and so make it physically better able to withstand the washing process. This preliminary removal of free alkali is especially advantageous in the case of the highly alkaline reaction mixtures, since pressing will ordinarily reduce the volume of gels of this type from 50 to 70 per cent and the quantity of alkali proportionately. When pressing is used after the washing operation or operations, it serves both to reduce the amount of water which must be removed in the subsequent drying, and also physically strengthens the gel and the resultant dried product. As a matter of fact, it is readily possible to employ the pressing operation both before and after washing; in this case I prefer to make the first pressing not as complete as if only one pressing operation were to be employed.

It is not necessary that the reacting solutions be used under such conditions that the reaction mixture will set to a gel. On the contrary, they may be employed under such conditions of dilution and other circumstances that a gelatinous precipitate is formed which settles more or less readily from the mother liquor. In this case the methods of washing already mentioned may be supplemented if desired by washing by decantation, washing in a filter press, or by any other convenient means. Where a filter press is employed, the press cake may be further subjected to an additional pressing operation, such as in a hydraulic or mechanical press, in order further to reduce the water content.

In general I prefer to continue the use of the buffer wash solution until it will become pink with phenolphthalein indicator. This spent buffer solution is then replaced with another portion of buffer solution of the desired pH. The washing process is generally continued until the base exchange material no longer gives a pink color with phenolphthalein.

I have found that it is not necessary to throw away the "spent" buffer solution, and that this solution may be "regenerated" by the addition of enough strong mineral acid, such as sulfuric or hydrochloric—to bring it again to the desired initial pH. This regeneration of the buffer solution may be made on the batch system, or can be accomplished continuously. Spent buffer solution may be regenerated and used repeatedly until the concentration of sodium salts makes the further employment of the solution impractical, at which time the solution may be evaporated or otherwise treated for the separation and recovery of one or more of the constituents.

It is obvious that one of the most important advantages of the buffer solution washing process herein described is that undesirable free alkali may rapidly be removed from a base exchange reaction product without any danger of local acidification of the material and consequent loss of base exchange capacity. As already pointed out, the pH of the buffer wash solution must be below that representing free alkali—usually taken as about 8.3 or 8.4; and I prefer in general to use a buffer wash solution the initial pH of which is not much below about 7.0. It was pointed out in Rudorf U. S. Patent No. 1,263,707 and has been well recognized since, that these precipitated and gelatinous zeolites are sensitive to the degree of alkalinity or acidity and that in a reaction mixture acid to methyl-orange all the alkali present combines with the acid leaving none in combination with the silica and alumina, in which case there is no base exchange capacity. Because of this and in order to avoid the injurious effects of acids above referred to I in no case employ a buffer wash solution which is acid to the methyl-orange class of indicators, from which it follows that the pH of the buffer wash solution used is never lower than about 4.3.

Using the buffer wash solution of my invention the entire washing operation can be completed within a short time, usually within two or three hours or even less; and the relatively high concentration of electrolyte in the wash solution prevents any tendency toward peptization and consequent loss of the gelatinous product.

Another advantage in the improvement of the buffer washing process of the invention is in some cases a very striking increase in base exchange capacity of analogous materials prepared according to other procedures. For example, in my copending application Serial No. 708,672, filed April 24, 1924 now Patent 1,869,087, there is described a method of avoiding the difficulties arising from the presence of excessive free alkali in a base exchange reaction mixture which consists in treating the reaction mixture, preferably by incorporation in it, with an amount of an acid sufficient to neutralize substantially all of the free alkali. While a very useful final product is obtained in this way, I have found that the products prepared in accordance with the disclosure of the present application are much superior. For example, if with the reaction mixture obtained from the use of the amounts of sodium aluminate and sodium silicate described above, enough sulphuric acid is incorporated to give the reaction mixture a pH of about 8.0, the final product will have a base exchange capacity of about 8000 grains of calcium carbonate equivalent per cubic foot of the product; while if the gel formed by the reaction of the sodium aluminate and sodium silicate alone is washed with a buffer solution—such as the borax, sodium chloride and boric acid solution herein described—in accordance with the process of my invention until the pH of the gel is about 8.0, the final dried product has a base exchange capacity of about 16,000 grains per cubic foot. In addition to this striking improvement in base exchange capacity, the use of the buffer wash method has a distinct manufacturing advantage in this case in that much more concentrated reacting solutions may be employed.

While in the foregoing examples, the buffer wash solution has been used to remove free alkali from base exchange reaction products while they are still in a moist and gelatinous condition, the employment of the buffer wash solution is not limited to this stage of the manufacturing process. For example, particularly when the concentrations of the reacting solutions and other conditions are so chosen as to produce a stiff, homogeneous gel upon admixture of the reagents, the gel may be partially dried before being subjected to treatment with the buffer wash solution, after which the drying may be completed. Here again the buffer wash treatment may be preceded and/or followed by pressing or other means of removing liquid from the base exchange materials, and may also be preceded and/or followed by washing with water. The advantages of the partial drying are: first, that the lumps of gel are hardened and so better able physically to withstand the washing process; second, that the volume of gel is much reduced, making possible the employment of smaller washing apparatus; and third, the capillary passages within the gel particle are made more open, thus greatly facilitating the penetration of the buffer wash solution with resultant more rapid removal of free alkali.

The buffer wash solution may be employed for the treatment of base exchange materials even after these have been dried to the point of complete removal of moisture. This application of the invention, however, is limited for the most part to those types of preparation in which the reaction products, either as formed, or after some step in processing, such as pressing, contain an amount of free alkali which will permit complete drying of the product without serious deterioration. In such cases, the buffer wash treatment is advantageous chiefly in that it affords a convenient and rapid method for removing from the product free alkali which would in special industries be highly objectionable even if present only in small amount or for only a relatively short time.

To those skilled in the art there will doubtless occur many other variations and modifications of the basic processes disclosed in this application. All such modifications and departures from the precise directions of this disclosure which have been given for illustration and exemplification are contemplated within the scope of my invention insofar as it is set forth and defined in the appended claims.

What I claim is:

1. The process of preparing base exchange materials which comprises reacting solutions to obtain a gelatinous alkaline product and subsequently and prior to complete drying treating the product with a buffer solution capable of neutralizing free alkali therein but having a pH of not less than about 4.3.

2. A process according to claim 1, in which the reaction product is formed as a firm, homogeneous gel embracing substantially all the constituents of the reaction mixture.

3. A process according to claim 1, in which the gelatinous reaction product is formed as a flocculent precipitate.

4. A process according to claim 1 in which the gelatinous material after treatment with the buffer wash solution, is dried at a temperature not above 100 degrees C.

5. A process according to claim 1 in which the product is washed with buffer solution until it is substantionally neutral to phenolphthalein.

6. In the process of preparing base exchange materials according to claim 1, the step which comprises the regeneration of the spent buffer solution with a strong acid to restore the solution to its initial pH and then reapplying it to the product.

7. A process according to claim 1 comprising the additional step of separating liquid as such from the gelatinous reaction product.

8. The process of claim 1 in which the buffer solution contains boric acid.

ABRAHAM S. BEHRMAN.